United States Patent
Hwang et al.

(10) Patent No.: US 12,473,016 B2
(45) Date of Patent: Nov. 18, 2025

(54) REAR WHEEL STEERING SYSTEM

(71) Applicants: Hyundai Motor Company, Seoul (KR); Kia Corporation, Seoul (KR)

(72) Inventors: Sang Woo Hwang, Seoul (KR); Jai Hak Kim, Gunpo-si (KR); Hyeong Seop Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 882 days.

(21) Appl. No.: 17/693,104

(22) Filed: Mar. 11, 2022

(65) Prior Publication Data

US 2022/0388568 A1    Dec. 8, 2022

(30) Foreign Application Priority Data

Jun. 4, 2021    (KR) .................. 10-2021-0072993

(51) Int. Cl.
| | |
|---|---|
| *B62D 5/04* | (2006.01) |
| *H01F 1/44* | (2006.01) |
| *H02P 27/06* | (2006.01) |

(52) U.S. Cl.
CPC ......... *B62D 5/0463* (2013.01); *B62D 5/0445* (2013.01); *H01F 1/447* (2013.01); *H02P 27/06* (2013.01)

(58) Field of Classification Search
CPC ..... B62D 5/0463; B62D 5/0445; H01F 1/447; H02P 27/06
USPC ........................................................ 180/445
See application file for complete search history.

(56) References Cited

U.S. PATENT DOCUMENTS

| | | | | |
|---|---|---|---|---|
| 6,949,901 | B1 * | 9/2005 | Collier-Hallman | B62D 6/002 318/434 |
| 10,976,827 | B2 * | 4/2021 | Battlogg | G06F 3/0362 |
| 2004/0084887 | A1 * | 5/2004 | Loh | F16F 9/535 280/779 |
| 2005/0188690 | A1 * | 9/2005 | Namuduri | B62D 5/065 60/435 |

FOREIGN PATENT DOCUMENTS

| | | | | |
|---|---|---|---|---|
| JP | 2006067733 A | * | 3/2006 | ............ Y02T 10/72 |
| JP | 2013-169801 | | 9/2013 | |
| JP | 5796735 | | 8/2015 | |
| KR | 102043057 B1 | * | 11/2019 | ............... B60G 7/04 |

OTHER PUBLICATIONS

Screw Backdriving Efficiency [Website]. Retrieved from http://www.roton.com/screw-university/screw-actions/screw-backdriving-efficiency.

* cited by examiner

*Primary Examiner* — John Olszewski
*Assistant Examiner* — Nathaniel William Watkins
(74) *Attorney, Agent, or Firm* — Morgan Lewis & Bockius LLP

(57) ABSTRACT

A rear wheel steering motor generates rotational force. A movement converter has a converting portion coupled to the wheel steering motor and configured to convert the rotational force transmitted from the rear wheel steering motor into a linear movement. An MR fluid is applied on the converting portion. An inverter controls driving of the rear wheel steering motor. A magnet switch works in concert with the inverter to change a magnetic field to selectively provide the magnetic field to the MR fluid of the movement converter.

7 Claims, 4 Drawing Sheets

REAR WHEEL STEERING SYSTEM

CROSS REFERENCE TO RELATED APPLICATION

The present application claims priority to Korean Patent Application No. 10-2021-0072993, filed Jun. 4, 2021, the entire contents of which is incorporated herein for all purposes by this reference.

BACKGROUND OF THE INVENTION

Field of the Invention

The present invention generally relates to a rear wheel steering system able to operate at a high efficiency in the case of forward input from a rear wheel steering motor while facilitating self-locking to be performed reliably in the case of no input from the rear wheel steering motor or reverse input from a rear wheel.

Description of Related Art

A rear wheel steering (RWS) system is intended to enable the rear wheels to be steered together with the front wheels. At a lower speed, the RWS system controls a rear wheel steering angle to be out of phase from or in the opposite direction to a front wheel steering angle to reduce the turning radius. At a higher speed, the RWS system controls the rear wheel steering angle to be in phase with or in the same direction as the front wheel steering angle to improve driving stability.

In the case of reverse input from a rear wheel, it is difficult for the rear wheel steering system to realize straight driving, due to the instability of the rear wheel. Thus, it is required to obtain driving stability of the rear wheels and prevent back driving to provide a fail-safe function against the malfunction of the rear wheel steering system.

In this regard, a rear wheel steering system of the related art uses a self-lockable gear mechanism including a lead screw.

The lead screw has a self-locking characteristic in which reverse efficiency is zero (0) in specific conditions (e.g., a friction characteristic and a lead angle). However, in such conditions, forward efficiency is also significantly reduced, which is problematic.

Thus, as the forward efficiency of the gear mechanism is reduced, the output power of a motor is required to be increased accordingly, and thus, the size of the motor, costs, energy loss, etc. are also increased.

in the RWS system having the same level of steering angle as the front wheels within the current range of rear wheel steering angle i.e., ±3°, or a rear wheel steering system supporting a great rear wheel steering angle and facilitating holonomic motion, greater output power is required, and thus, an improvement in the forward efficiency is essentially required.

To overcome such a drawback of the reduced forward efficiency, there has been proposed a device that uses a mechanism (e.g., a ball screw or a planetary roller screw) having a higher efficiency than the lead screw and that may additionally realize a locking operation by controlling a solenoid valve in specific conditions.

However, according to this device, the locking is activated intermittently, and an additional operation of controlling the solenoid valve is required. Accordingly, the responsiveness of the rear wheel steering system is reduced, which is problematic.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a rear wheel steering system able to operate at a high efficiency in the case of forward input from a rear wheel steering motor while facilitating self-locking to be performed reliably in the case of no input from the rear wheel steering motor or reverse input from a rear wheel.

In various aspects of the present invention, provided is a rear wheel steering system including: a rear wheel steering motor configured for generating rotational force; a movement converter having a converting portion coupled to the wheel steering motor and configured to convert the rotational force transmitted from the rear wheel steering motor into a linear movement, with a magnetorheological (MR) fluid being applied on the converting portion; an inverter connected to the wheel steering motor and configured to control driving of the rear wheel steering motor; and a magnet switch connected to the inverter and configured to work in concert with the inverter to change a magnetic field to selectively provide the magnetic field to the MR fluid of the movement converter.

When a current is applied to the inverter, the magnetic field of the magnet switch may be removed from the MR fluid. When no current is applied to the inverter, the magnetic field of the magnet switch may be supplied to the MR fluid.

The magnet switch may include: an electromagnet connected to the inverter and magnetizing to generate the magnetic field in a response to a current received from the inverter; and a permanent magnet connected to first and second end portions of a core of the electromagnet through conductive connectors.

The permanent magnet may be provided between the electromagnet and the MR fluid.

The MR fluid may be applied between a lead nut configured to be rotated by the rotational force of the rear wheel steering motor and a lead screw bar engaged to the lead nut and configured to linearly move in a response to rotation of the lead nut. The magnet switch may be provided in a shape wound around the lead nut.

The permanent magnet may be provided more adjacent to the lead nut than the electromagnet.

According to exemplary embodiments of the present invention, when the rear wheel steering motor is driven, power is transmitted to the rear wheel by the soft state of the MR fluid or the softening of the MR fluid. When the rear wheel steering motor is not driven, reverse input from the rear wheel is blocked to realize the self-locking operation.

Furthermore, when the rear wheel steering system is powered off, the MR fluid may remain in the hardened state to enable the self-locking function, also obtaining a fail-safe function.

Furthermore, in comparison to the self-locking mechanism of the related art, the locking operation may not be intermittent and locking and releasing may be performed rapidly to improve operability. The efficiency of a gearbox may be improved, reducing the capacity of the motor. The self-locking operation may be realized without addition of a controller or a sensor, reducing costs and weight.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
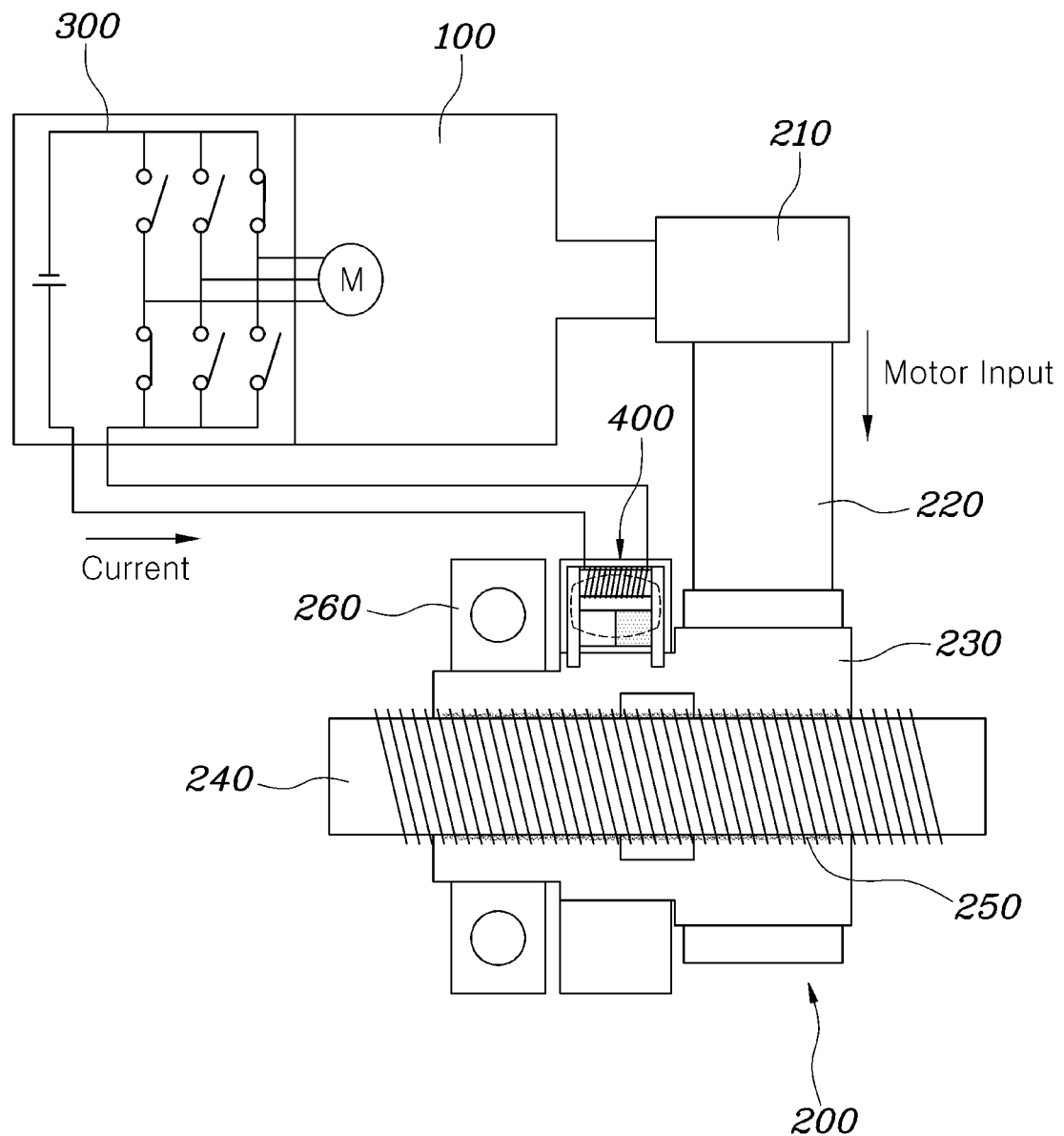
FIG. 1 is a diagram illustrating the softening of MR fluid in a response to a rear wheel steering motor being driven according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings.

Figure 2:
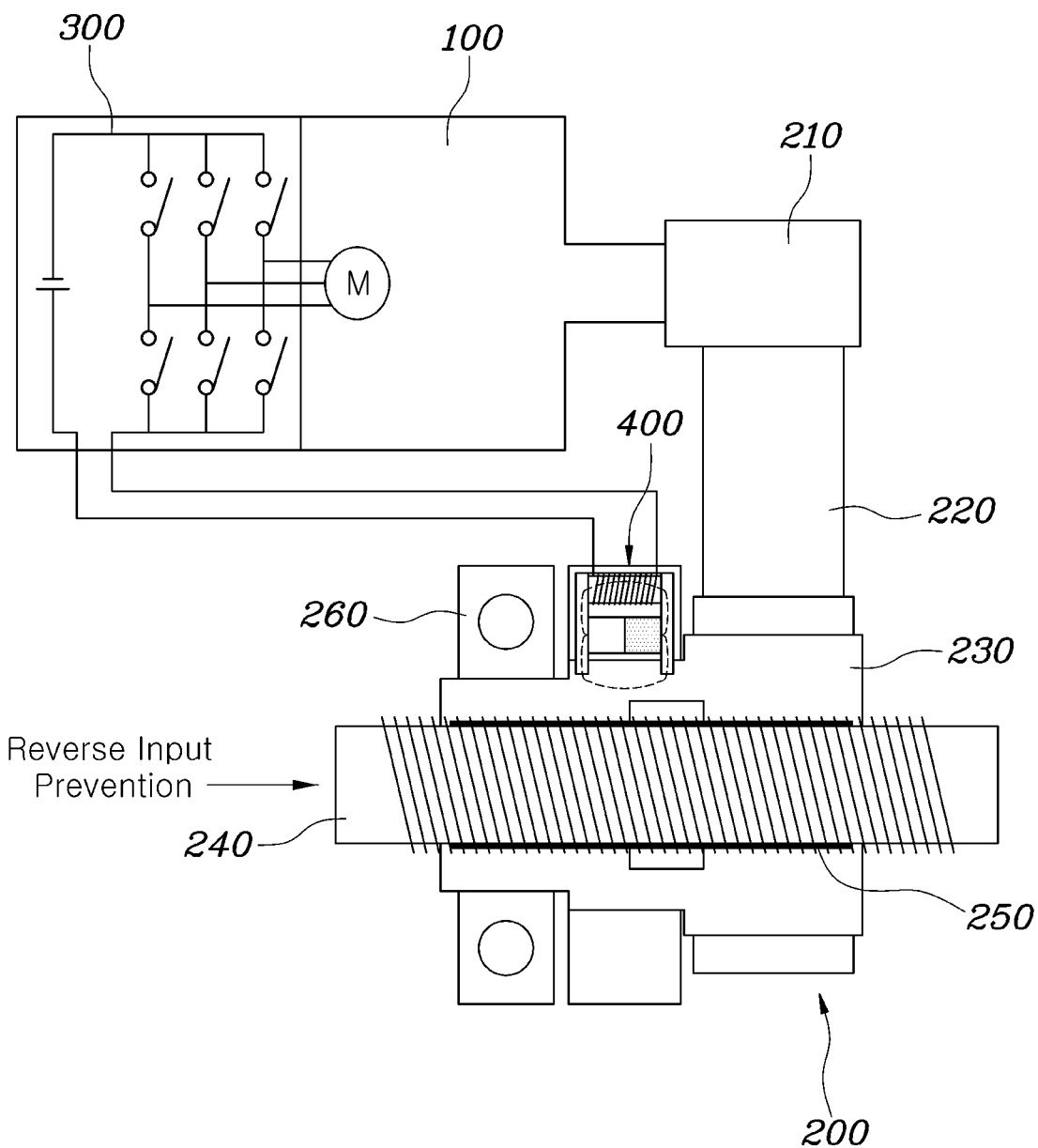
FIG. 2 is a diagram illustrating the hardening of the MR fluid in a response to the rear wheel steering motor not being driven according to various exemplary embodiments of the present invention.

FIG. 1 is a diagram illustrating the softening of a magnetorheological (MR) fluid 250 in a response to a rear wheel steering motor 100 being driven according to various exemplary embodiments of the present invention, and FIG. 2 is a diagram illustrating the hardening of the MR fluid 250 in a response to a rear wheel steering motor 100 not being driven according to various exemplary embodiments of the present invention.

Referring to FIG. 1 and FIG. 2, a rear wheel steering system according to various exemplary embodiments of the present invention may include the rear wheel steering motor 100 generating rotational force; a movement converter 200 having a converting portion coupled to the wheel steering motor and configured to convert the rotational force transmitted from the rear wheel steering motor 100 into a linear movement, with the MR fluid 250 being applied on the converting portion; an inverter 300 configured to control the driving of the rear wheel steering motor 100; and a magnet switch 400 configured to work in concert with the circuit of the inverter 300 to change a magnetic field to selectively provide the magnetic field to the MR fluid 250.

Here, the movement converter 200 includes a motor pulley 210, the shaft of which is coupled to an output shaft of the rear wheel steering motor 100 such that the motor pulley 210 is rotatable. The motor pulley 210 and a lead nut 230 are connected through a belt 220 such that the lead nut 230 is rotatable.

Furthermore, the lead nut 230 is rotatably supported by a bearing 260. A lead screw bar 240 extends through the lead nut 230 to be linearly movable.

That is, in the driving of the rear wheel steering motor 100, the motor pulley 210 is rotated so that the lead nut 230 is rotated responsively through the belt 220. In a response to the rotation of the lead nut 230, the lead screw bar 240 is moved in the lateral direction while being transited to a linear movement, providing a steering angle of a rear wheel.

Here, the lead screw bar 240 having a relatively large lead angle is applied as a gear mechanism for converting the rotation of the rear wheel steering motor 100 into a linear movement, obtaining higher forward efficiency than the related-art screw.

Furthermore, the MR fluid 250 is a gel-type material, such as MR grease, having a magnetizing component. When a current flows through such an MR fluid 250, the MR fluid 250 is arranged in a specific array and thus hardens while being magnetized. When no current flows, the MR fluid 250 softens or remains in the soft gel state, performing a function like grease.

Furthermore, the inverter 300 is directed to control the driving of the rear wheel steering motor 100. When a current flows through the inverter 300 in a response to a signal applied to the insulated gate bipolar transistor (IGBT) of the inverter 300 to control the rear wheel steering motor 100, the circuit of the inverter 300 supplies the current to the magnet switch 400.

Thus, the magnet switch 400 is configured to control the magnetic field applied to the MR fluid 250 while changing the magnetic field, depending on the supply of the current thereto through the inverter 300.

According to the above-described configuration, in the driving of the rear wheel steering motor 100, the magnetic field of the magnet switch 400 is changed by the current flowing through the inverter 300, causing the MR fluid 250 to soften. In contrast, in the non-driving of the rear wheel steering motor 100, the supply of the current through the inverter 300 is stopped, and thus, the magnetic field of the magnet switch 400 is changed, causing the MR fluid 250 to harden.

Thus, in the driving of the rear wheel steering motor 100, power is transmitted to the rear wheel through the movement converter 200 through the softened MR fluid 250. In the case of reverse input from the rear wheel, the self-locking function of the movement converter 200 may be realized reliably through the hardened MR fluid 250, and a rear wheel steering (RWS) system supporting a great rear wheel steering angle may be realized using the front wheel shift-by wire (SBW) system.

Furthermore, not only in a situation in which the rear wheel steering motor 100 is not driven but also in a power-off situation, the self-locking function may be realized automatically by the cured MR fluid 250, also obtaining a fail-safe function.

Furthermore, the present invention may be configured such that, when a current is applied to the inverter 300, the magnetic field of the magnet switch 400 is removed from the MR fluid 250, and when no current is applied to the inverter 300, the magnetic field of the magnet switch 400 is supplied to the MR fluid 250.

That is, in the driving of the rear wheel steering motor 100, the magnet switch 400 may remove the magnetic field that has been supplied to the MR fluid 250 to soften the MR fluid 250 before the rear wheel steering motor 100 has an actual movement. Thus, at least the operation of the magnet switch 400 is required to be earlier than the driving of the rear wheel steering motor 100.

In this regard, in a situation in which a controller configured for controlling the magnet switch 400 is additionally provided for use, the movement of the rear wheel steering motor 100 needs to be sensed, and complicated and faster determinations, such as control timing management for operating the magnet switch 400 before the detecting, are required.

However, in a situation in which the magnet switch 400 works in concert with the inverter 300 controlling the rear wheel steering motor 100 and the operation of the magnet switch 400 is controlled by a current from the inverter 300 according to various exemplary embodiments of the present invention, the current flows through the magnet switch 400 earlier than through the rear wheel steering motor 100 to activate the magnet switch 400 to change the magnetic field before actual driving of the rear wheel steering motor 100, causing the MR fluid 250 to soften.

Accordingly, it is possible to operate the magnet switch 400 before the driving of the rear wheel steering motor 100 without adding, for example, a separate high-performance controller or sensor, reliably driving the rear wheel steering motor 100 while reducing costs.

Figure 3:
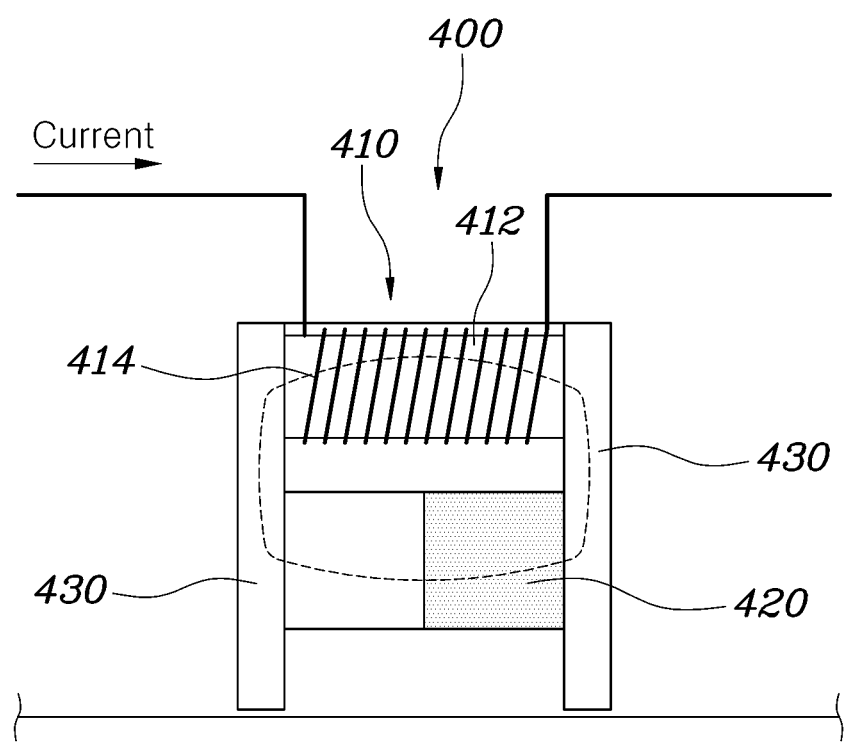
FIG. 3 is a diagram illustrating the operational relationship of the magnet switch illustrated in FIG. 1.
Figure 4:
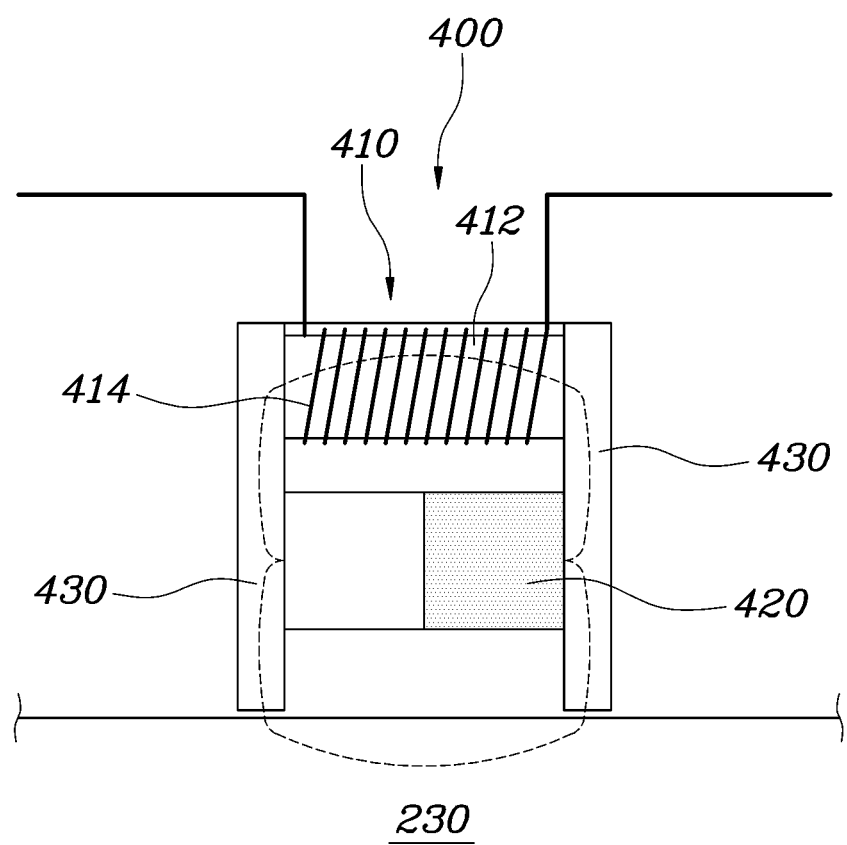
FIG. 4 is a diagram illustrating the operational relationship of the magnet switch illustrated in FIG. 2.

FIG. 3 is a diagram illustrating the operational relationship of the magnet switch 400 illustrated in FIG. 1, and FIG. 4 is a diagram illustrating the operational relationship of the magnet switch 400 illustrated in FIG. 2.

Referring to FIGS. 3 and 4, the magnet switch 400 includes: an electromagnet 410 magnetizing in a response to a current supplied by the inverter 300; and a permanent magnet 420 connected to both end portions of a core 412 of the electromagnet 410 through conductive connectors 430.

Furthermore, the permanent magnet 420 is a structure disposed between the electromagnet 410 and the MR fluid 250.

For example, a coil 414 is wound on the core 412 to form the electromagnet 410, and both end portions of the coil 414 is connected to the inverter 300 such that a current may flow through the coil 414.

Furthermore, both end portions of the core 412 and both end portions of the permanent magnet 420 are connected in parallel through the conductive connectors 430 such that a current may flow through the electromagnet 410 and the permanent magnet 420.

When a current flows through the electromagnet 410 in a response to the operation of the circuit of the inverter 300 as illustrated in FIG. 3, a magnetic field is only generated between the electromagnet 410 and the permanent magnet 420 with no magnetic field being generated outside the electromagnet 410 or the permanent magnet 420. Consequently, the magnetic field has no effect on the MR fluid 250.

Consequently, the MR fluid 250 softens to act as grease, allowing power supplied by the rear wheel steering motor 100 to be transmitted to the rear wheel through the movement converter 200.

In contrast, when no current flows through the electromagnet 410 in a response to the non-operation of the circuit of the inverter 300 as illustrated in FIG. 4, the magnetic field of the permanent magnet 420 is not only applied to the electromagnet 410 but also directed toward the MR fluid 250, having an effect on the MR fluid 250.

Consequently, the MR fluid 250 hardens, and thus, the self-locking operation of the movement converter 200 is realized reliably.

Furthermore, with reference to FIG. 1, according to various exemplary embodiments of the present invention, the MR fluid 250 may be applied between the lead nut 230 configured to be rotated by the rotational force of the rear wheel steering motor 100 and the lead screw bar 240 configured to linearly move in a response to the rotation of the lead nut 230, and the magnet switch 400 may be provided in a shape wound around the lead nut 230.

Furthermore, the permanent magnet 420 may be provided more adjacent to the lead nut 230 than the electromagnet 410.

That is, the lead nut 230 is made from a conductor, and the MR fluid 250 is applied between the lead nut 230 and the lead screw bar 240.

Thus, when no current flows through the electromagnet 410, the magnetic field of the permanent magnet 420 is applied to the lead nut 230, having an effect on the MR fluid 250 applied between the lead nut 230 and the lead screw bar 240.

Consequently, the magnetic field is applied to not only the electromagnet 410 but also to the MR fluid 250, having an effect on the MR fluid 250. As a result, the MR fluid 250 hardens, and thus, the self-locking operation of the movement converter 200 is realized reliably.

Hereinafter, the operational relationship of the rear wheel steering system according to various exemplary embodiments of the present invention will be described.

When the inverter 300 is operated to drive the rear wheel steering motor 100, a current flows through the inverter 300 as illustrated in FIG. 1.

Accordingly, a current generated in the inverter 300 is supplied to the electromagnet 410 of the magnet switch 400, magnetizing the electromagnet 410.

Consequently, a magnetic field is only generated between the electromagnet 410 and the permanent magnet 420 by the current flowing through the electromagnet 410 and is not directed toward the lead nut 230, having no effect on the MR fluid 250 applied between the lead nut 230 and the lead screw bar 240.

Accordingly, the MR fluid 250 softens, provided as grease between the lead nut 230 and the lead screw bar 240.

Furthermore, in a response to the operation of the inverter 300, the rear wheel steering motor 100 is controlled to operate.

Here, since the current flows from the inverter 300 to the magnet switch 400 before the driving of the rear wheel steering motor 100, movement conversion is smoothly enabled between the lead nut 230 and the lead screw bar 240. Consequently, power supplied by the rear wheel steering motor 100 is transmitted reliably to the rear wheel through the movement converter 200.

In contrast, when the operation of the inverter 300 is stopped, no current flows through the inverter 300 and thus no current is supplied to the electromagnet 410, as illustrated in FIG. 2.

Accordingly, as illustrated in FIG. 4, the magnetic field of the permanent magnet 420 is applied to not only the electromagnet 410 but also toward the lead nut 230, having an effect on the MR fluid 250 applied between the lead nut 230 and the lead screw bar 240.

Consequently, the MR fluid 250 hardens and thus movement conversion is not enabled between the lead nut 230 and the lead screw bar 240. As a result, the self-locking operation of the movement converter 200 is realized.

As set forth above, according to various exemplary embodiments of the present invention, when the rear wheel steering motor 100 is driven, power is transmitted to the rear wheel by the softening of the MR fluid 250. When the rear wheel steering motor 100 is not driven, reverse input from the rear wheel is blocked to realize the self-locking operation, and thus, an RWS system supporting a great rear wheel steering angle may be realized using the front wheel SBW system.

Furthermore, when the rear wheel steering system is powered off, the MR fluid 250 may remain in the hardened state to enable the self-locking function. Consequently, the fail-safe function may also be obtained.

Furthermore, in comparison to the self-locking mechanism of the related art, the locking operation may not be intermittent and locking and releasing may be performed rapidly to improve operability. The efficiency of a gearbox may be improved, reducing the capacity of the motor. The self-locking operation may be realized without addition of a controller or a sensor, reducing costs and weight.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A wheel steering apparatus comprising:
   a wheel steering motor configured for generating rotational force;
   a movement converter having a converting portion coupled to the wheel steering motor and configured to convert the rotational force transmitted from the wheel steering motor into a linear movement, with a magnetorheological (MR) fluid being applied on the converting portion;
   an inverter connected to the wheel steering motor and configured to control driving of the wheel steering motor; and
   a magnet switch connected to the inverter and configured to work in concert with the inverter to change a magnetic field to selectively provide the magnetic field to the MR fluid of the movement converter,
   wherein the magnet switch includes:
      an electromagnet connected to the inverter and magnetizing to generate the magnetic field in a response to a current received from the inverter; and
      a permanent magnet connected to first and second end portions of a core of the electromagnet through conductive connectors.

2. The wheel steering apparatus of claim 1,
   wherein, when a current is applied to the inverter, the magnetic field of the magnet switch is removed from the MR fluid, and when no current is applied to the inverter, the magnetic field of the magnet switch is supplied to the MR fluid.

3. The wheel steering apparatus of claim 1, wherein the first and second end portions of the core and first and second end portions of the permanent magnet are connected in parallel through the conductive connectors.

4. The wheel steering apparatus of claim 1, wherein the permanent magnet is provided between the electromagnet and the MR fluid.

5. The wheel steering apparatus of claim 1,
wherein the converting portion of the movement converter includes a lead nut and a lead screw bar, and
wherein the MR fluid is applied between the lead nut configured to be rotated by the rotational force of the wheel steering motor and the lead screw bar engaged to the lead nut and configured to linearly move in a response to rotation of the lead nut.

6. The wheel steering apparatus of claim 5,
wherein the magnet switch is provided in a shape wound around the lead nut.

7. The wheel steering apparatus of claim 5, wherein the permanent magnet is provided more adjacent to the lead nut than the electromagnet.

\* \* \* \* \*